United States Patent [19]
Czichy

[11] Patent Number: 5,349,176
[45] Date of Patent: Sep. 20, 1994

[54] DEVICE FOR ACQUIRING DATA FROM A LIGHT BEAM AND A COMMUNICATION SYSTEM INCLUDING THE DEVICE WITH DUAL SENSOR FASTENED ON A STIFF FRAME

[75] Inventor: Reinhard H. Czichy, Noordwijkerhout, Netherlands

[73] Assignee: Agence Spatiale Europeenne, Paris Cedex, France

[21] Appl. No.: 52,753

[22] Filed: Apr. 27, 1993

[30] Foreign Application Priority Data

Apr. 27, 1992 [FR] France ............................ 92 05183

[51] Int. Cl.$^5$ ................................................ H04B 10/00
[52] U.S. Cl. ................................ 250/206.2; 250/208.2
[58] Field of Search ............... 250/206.2, 208.2, 206.1, 250/203.4; 356/4, 152; 359/896, 865; 342/355, 358, 359; 343/758, 766

[56] References Cited

U.S. PATENT DOCUMENTS

| | | | |
|---|---|---|---|
| 3,723,013 | 3/1973 | Stirland et al. | 250/208.2 |
| 4,672,191 | 6/1987 | Cofield | 250/203.4 |
| 5,095,199 | 3/1992 | Selby et al. | |

OTHER PUBLICATIONS

Patent Abstracts of Japan, vol. 9, No. 219 (M-410)(1942) Sep. 6, 1985.
Proceedings of ECO, Optical Space Communication, SPIE, vol. 1131, Apr. 24, 1989, Paris, France, pp. 72-82, "An Acquistion Sensor for Optical Communications in Space", E. Corpaccioli and G. Borghi.

*Primary Examiner*—David C. Nelms
*Assistant Examiner*—Que T. Le
*Attorney, Agent, or Firm*—Sughrue, Mion, Zinn, Macpeak & Seas

[57] ABSTRACT

The invention relates mainly to a data acquisition device and to a communications system using such a device. The invention provides a device for acquiring data from a light beam, the device comprising an optical system, a first sensor, and a second sensor, wherein at least the two sensors are in successive alignment on a common axis of the beam, the first sensor including, on the axis of the beam, a transparent zone, in particular an opening, that is transparent to at lease a portion of the beam, thereby enabling the second sensor to be illuminated. The invention is mainly applicable to optical communications between satellites, or with a satellite, or to a lidar type device for measuring distance and azimuth, or to implementing homing system.

12 Claims, 3 Drawing Sheets

DEVICE FOR ACQUIRING DATA FROM A LIGHT BEAM AND A COMMUNICATION SYSTEM INCLUDING THE DEVICE WITH DUAL SENSOR FASTENED ON A STIFF FRAME

The invention relates mainly to a data acquisition device and to a communications system including such a device.

BACKGROUND OF THE INVENTION

Tracking systems are required for stabilizing images of distant targets or mobiles on a detector sensor, and for enabling stable contact to be established over an extended period of time. Such optoelectronic systems apply, in particular, to laser communications systems between satellites, to docking sensors for use in a docking operation in space, to pointing systems for telescopes or for interferometer elements as used in astronomy, and also to missile homing systems.

Such tracking systems include a tracking sensor constituted by a matrix of individual photoelectrical sensors for comparing the intensities of light signals received at a plurality of points regularly spaced around the axis of the beam which is being tracked.

It is also known to use a semitransparent mirror to take a fraction of the intensity of the beam that is focused on the tracking sensor, with the light transmitted by the semitransparent mirror being focused on the photoelectrical sensor of the detector. As explained below with reference to FIG. 1, devices of that type become misadjusted very often, in particular because of thermal expansion.

Semiconductor chips are also known that include a photoelectrical sensor or detector surrounded by an annular tracking sensor constituted by four elementary photoelectrical sensors. As explained below with reference to FIG. 2, such an implementation is unsuitable for selecting different magnifications for the detector sensor and for the tracking sensor. In addition, it presents a dead field between the fields of view of the detector sensor and of the tracking sensor.

OBJECTS AND SUMMARY OF THE INVENTION

Consequently, an object of the present invention is to provide a device for acquiring data from a light beam, the device including a tracking sensor and a detector sensor enabling stable operation to be achieved both in the short term and in the long term, independently of temperature variations.

Another object of the present invention is to provide a data acquisition device including a one-piece part onto which the tracking sensor and the detector sensor are secured.

It is also an object of the present invention to provide a miniaturized data acquisition device of small bulk and weight.

Another object of the present invention is to provide a data acquisition device enabling coarse pointing to be performed over a large field of view.

Another object of the present invention is to provide a data acquisition device enabling very accurate pointing to be performed.

Another object of the present invention is to provide a data acquisition device enabling the energy of the light beam to be shared between the detector sensor and the tracking sensor making tracking possible while optimizing the signal/noise (S/N) ratio of the detector.

Finally, an object of the present invention is to provide a data acquisition device suitable for being easily adapted to various types of detector by changing an optical system associated with the detector sensor.

The invention mainly provides a device for acquiring data from a light beam, the device comprising an optical system, a first sensor, and a second sensor, wherein at least the two sensors are in successive alignment on a common axis of the beam, the first sensor including, on the axis of the beam, a transparent zone, in particular an opening, that is transparent to at least a portion of the beam, thereby enabling the second sensor to be illuminated.

The invention also provides a device wherein the first photoelectrical sensor is an acquisition sensor and/or a tracking sensor for the beam, said sensor including a plurality of elementary photo-electrical sensors suitable for being illuminated by signals of amplitudes that depend on the orientation of the beam relative to said acquisition and/or tracking sensor, and in that the second sensor is a detector sensor for receiving data contained in the beam, in particular in the form of beam modulation.

The invention also provides a device wherein the optical system distributes a fraction of the energy of the beam simultaneously on the first sensor and on the second sensor.

The invention also provides a device wherein the optical system is a hybrid optical system including an optical element operating in reflection or in refraction, and an optical element operating in diffraction.

The invention also provides a device wherein the optical system includes a lens focusing the major portion of the beam on the transparent zone of the first sensor, and a diffraction grating, in particular a circular grating, projecting a ring of light on the first sensor, in particular a circular ring centered on the axis of the beam.

The invention also provides a device further including an optical system disposed on the optical axis between the first sensor and the second sensor to focus the light that penetrates through the transparent zone onto the second sensor.

The invention also provides a device wherein the second sensor receives substantially 80% to 95% of the light energy in the beam as delivered by the optical system.

The invention also provides a device wherein the second sensor has a larger field of view than the first sensor.

The invention also provides a device wherein the first and second sensors are secured relative to each other by a one-piece part made of a material that presents low thermal expansion.

The invention also provides a communications system, in particular for satellites, the system including a device for emitting a beam of light modulated by data to be transmitted, and at least one device of the invention.

BRIEF DESCRIPTION OF THE DRAWINGS

The invention will be better understood from the following description and the accompanying figures given as non-limited examples, and in which:

In FIGS. 1 to 5c, the same references are used to designate the same elements.

MORE DETAILED DESCRIPTION

Figure 1:
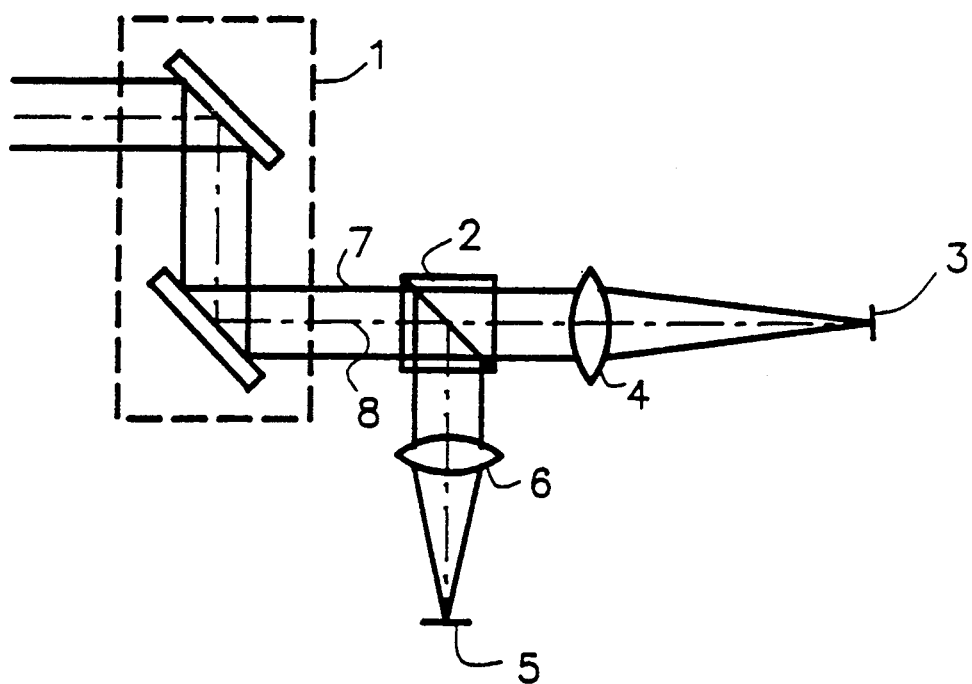
FIG. 1 is a diagram of a first embodiment of a known type of device.

FIG. 1 shows a known type of tracking device comprising an pointing device 1 represented by two mirrors, a semitransparent mirror 2, a detector sensor 3 associated with its own focusing optical system 4, and a tracking sensor 5 associated with its own focusing optical system 6. The pointing device 1 is pointed by actuators (not shown) in such a manner that an incident beam 7 which is to be tracked and from which data is to be extracted illuminates the detector sensor 3 and the tracking sensor 5. In the example shown, the semitransparent mirror 2 is at an angle of 45° relative to an axis 8 of the beam 7, and by reflection it transmits a fraction of the beam to the tracking sensor 5, the detector sensor 3 being illuminated by transmission through the mirror 2. As a result, any rotation or misalignment of the mirror 3 gives rise to tracking errors. Under such circumstances, the tracking sensor 5 may be properly illuminated while the axis 8 of the beam 7 no longer coincides with the center of the detector sensor 3, and in the worst case, the sensor 3 is not illuminated at all by the beam 7. This can be the result of long term drift, of a shock, or of shore term drift due to thermal expansion.

Figure 2:
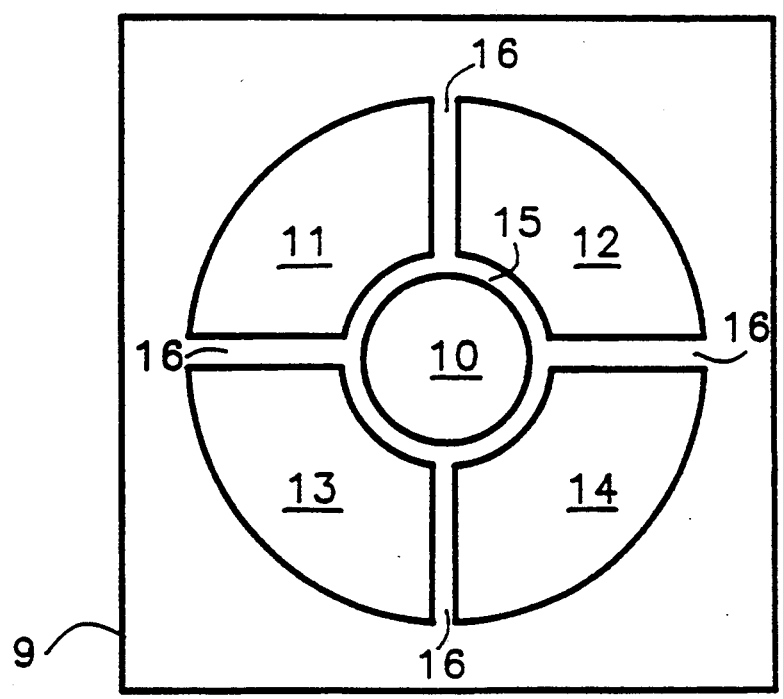
FIG. 2 is a diagram of a second embodiment of a known type of device.

FIG. 2 shows a semiconductor chip 9 supporting a detector sensor 10 in its center surrounded by an annular tracking sensor made up of four quadrants 11, 12, 13, and 14 forming four elementary sensors. The quadrants 11 to 14 are separated from the central sensor 10 by an electrically insulating zone 15, and pairs of successive quadrants are separated by respective electrically insulating zones 16.

The presence of the insulating zone 15 is extremely inconvenient and it causes a solid angle to appear in which the signal is no longer received by the central detector sensor 10 but without causing any signal to be generated by one of the elementary sensors 11 to 14 so as to apply corrections to the direction in which the pointing device is pointed. Furthermore, a single optical system is used for focusing the incident beam on the chip 9. As a result, the incident beam has the same magnification on the quadrants 11 to 14 as on the central sensor 10, which makes it impossible to optimize the field of view for tracking independently of the field of view of the detector sensor 10.

Figure 3:
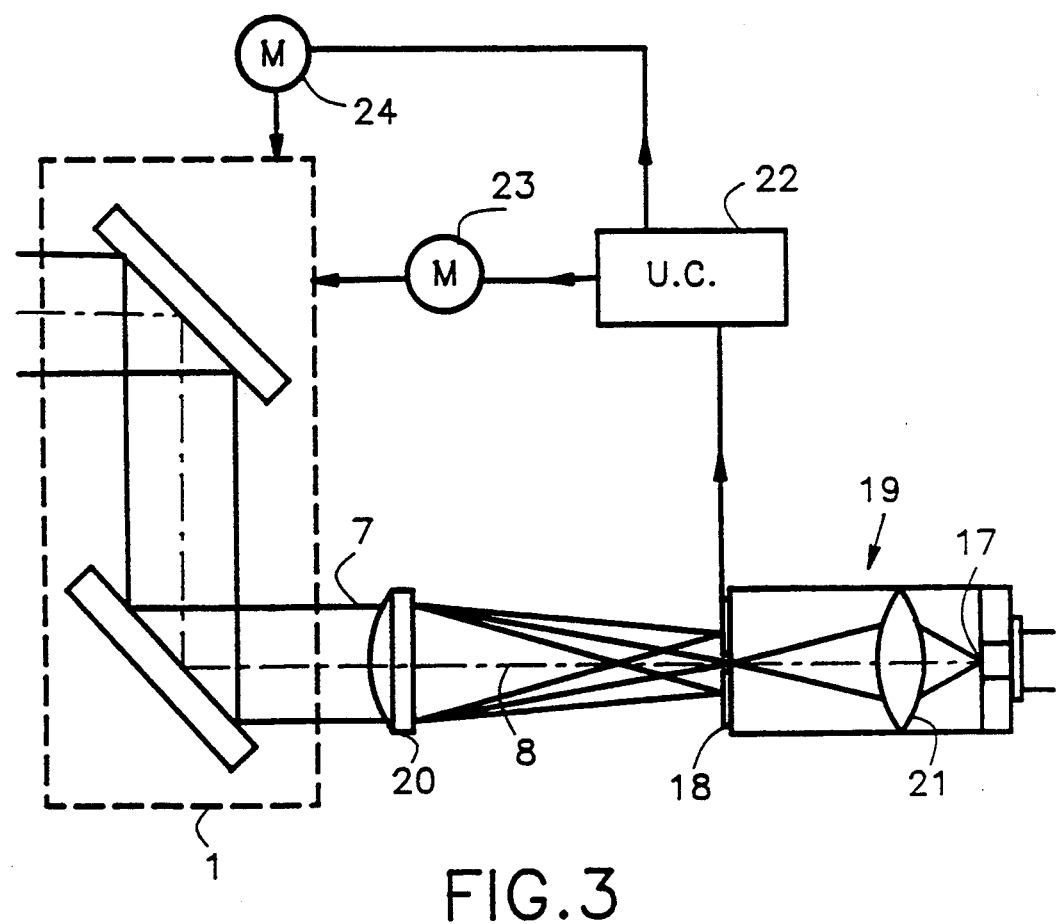
FIG. 3 is a diagram of a preferred embodiment of a device of the present invention.

FIG. 3 shows a particularly high performance apochromatic miniaturized embodiment of the data acquisition device of the present invention. The sensor 17 of the detector is placed behind a tracking sensor 18 in alignment on the same optical axis 8 of the incident beam 7. Advantageously, the tracking sensor 18 has a transparent zone in its center, advantageously in the form of an opening, through which the detector sensor 17 is illuminated. In a particularly advantageous embodiment of the device of the present invention, the front face of a one-piece part 19 carries the tracking sensor 18, while the detector sensor 17 is placed on its rear face. The part 19 is advantageously made of a material that has very low thermal expansion, e.g. an optical glass, cast silica, or a material sold under the name "Zerodur". An optical system 20 serves to illuminate the sensors 17 and 18 by means of the beam 7. Advantageously, a hybrid optical system is used that is the result of combining a conventional element operating in a reflection mode or advantageously in a refraction mode with an element that operates in a diffraction mode. For example, a converging lens or lens system is advantageously used, with the face thereof having a diffractive element deposited thereon, e.g. a holographic optical system, a Fresnel lens, or advantageously, a diffraction grating. The hybrid optical system 20 focuses the major portion of the incident beam 7 on the opening in the center of the tracking sensor 18, e.g. between 80% and 95% thereof, thus making it possible to achieve a good signal/noise ratio at the detector sensor 17. A small portion of the energy of the beam 7, e.g. 20% to 5% thereof, is uniformly distributed over all of the elementary sensors of the tracking sensor 18 when the axis 8 corresponds to the center of the tracking sensor 18, e.g. the beam is uniformly distributed over four quadrants of the sensor. Advantageously, an optical system 21 is provided inside the one-piece part 19 for the purpose of focusing the beam 7 on the detector sensor 17. Use may be made, for example, of one or more lens that operate by refraction or by means of hybrid optics. The change in focusing or in optical system 21 makes it possible to adapt the area of the focused light spot to photoelectrical sensors of different sizes. Advantageously, the tracking sensor 18 has a field of view that is greater than that of the detector sensor 17.

In addition to the sensor 18, the tracking system includes a central unit 22 and two actuators 23 and 24 for pointing the pointing device 1 in elevation and in bearing. As explained below, the central unit 22 uses the amplitudes of the signals received by the elementary tracking sensors to determine the corrections to be applied to the pointing of the beam 7 and it applies commands to the actuators 23 and 24 to obtain the desired azimuth.

Figure 4:
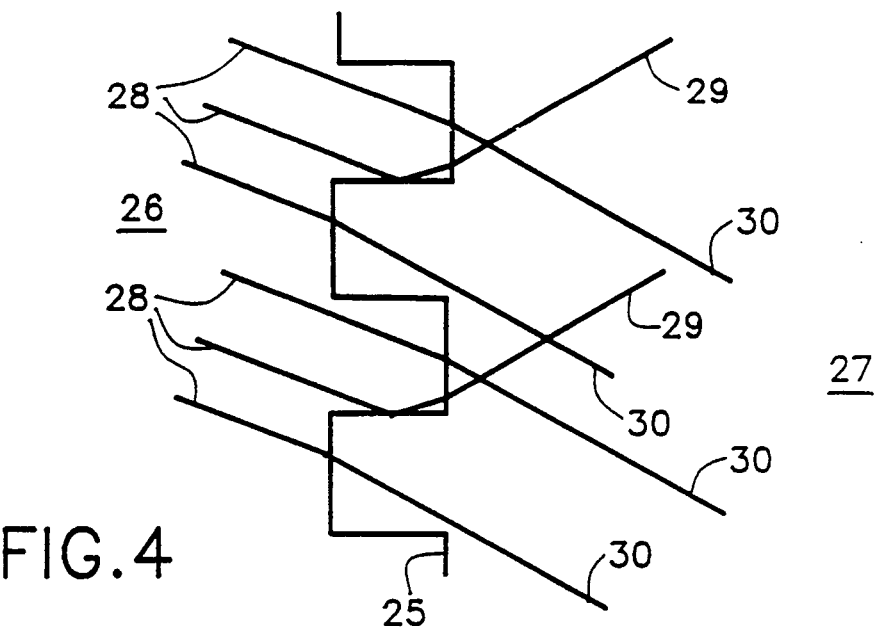
FIG. 4 is a diagram showing the light paths of rays in a device of the present invention.

FIG. 4 shows the behavior of a light beam passing through a portion of an interface 25 between a first medium 26 having a first refractive index n1, e.g. optical glass, and a second medium 27 having a second refractive index n2 less than the first refractive index n1, e.g. air or a vacuum. The grating also includes a plane face (not shown) parallel to the rampart-lake of the interface 25.

A fraction of the incident radiation 28 is reflected on the rampart of the interface 25 to form the radiation 29 that is to illuminate the elementary sensors of the tracking sensor 18.

For the major fraction of the incident radiation 28, the grating behaves like a plane interface surface, with the refracted radiation 30 being focused by one or more lenses of the optical system 20 (not shown) onto the central opening of the sensor 18.

Advantageously, the interface 25 is constituted by concentric circular rampart, with the center lying on the axis 8. It may be advantageous to use a grating whose interface 25 includes rampart occupying a plurality of levels. Such a grating is advantageously obtained by a plurality of successive photoetching steps.

The invention is naturally not limited to projecting the major fraction of the energy in the beam 7 onto the detector sensor 17. Devices in which the optical system 20 directs the major fraction of the energy in the beam 7 on the tracking sensor 18 or applies substantially half the energy of the beam 7 on each of the sensors 17 and 18 do not go beyond the scope of the present invention.

Figure 5A:
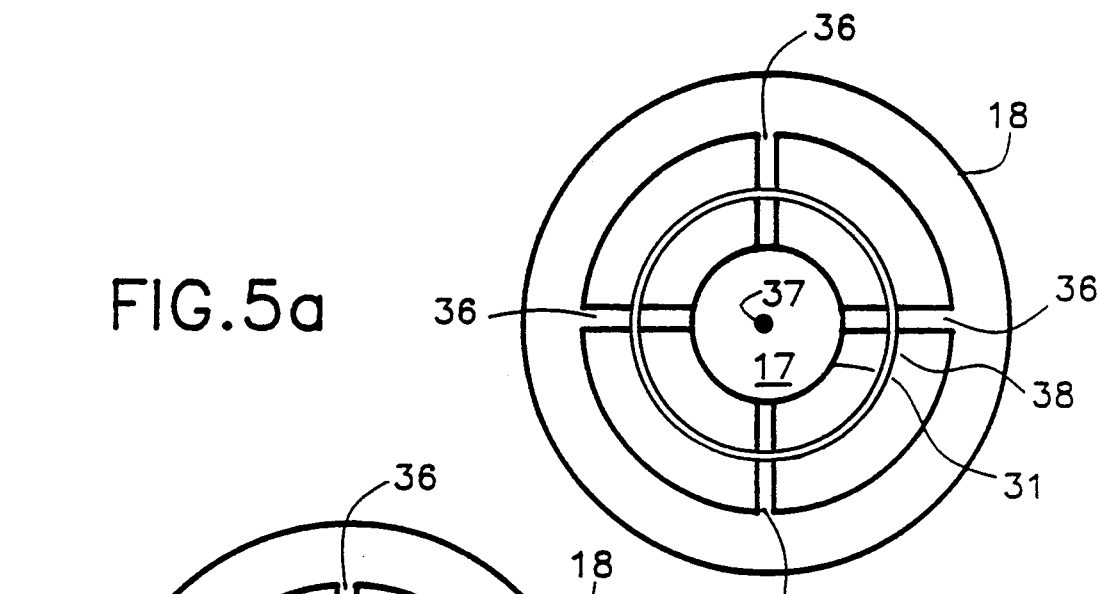
FIG. 5a, 5b, and 5c are diagrams showing the operation of the device of the invention.
Figure 5B:
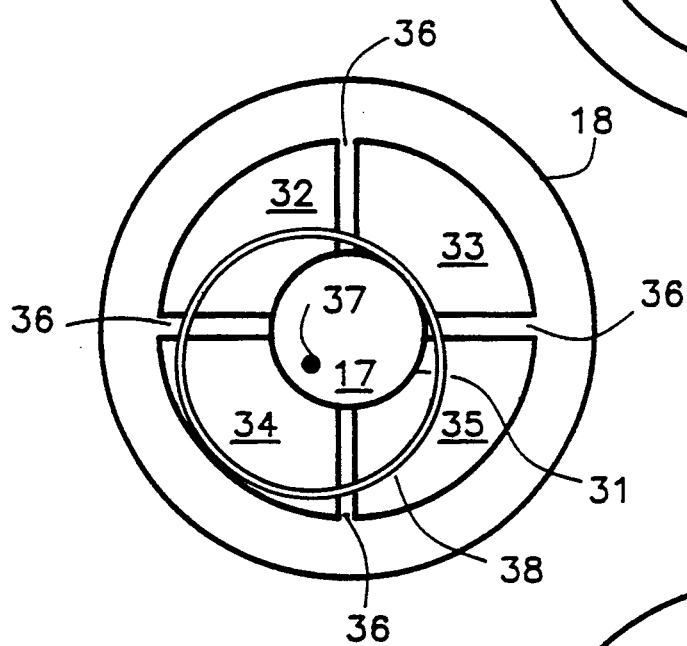
Figure 5C:
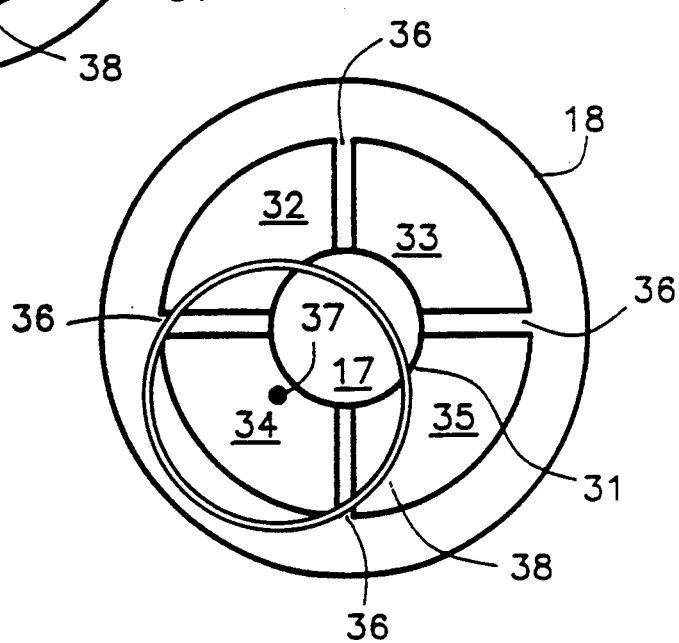

FIGS. 5a, 5b, and 5c show an advantageous example of the sensor 18 that includes a circular opening 31 in its center surrounded by four elementary sensors 32, 33, 34, and 35. Advantageously, each of the elementary sensors 32 to 35 is an annular quadrant extending right up to the central opening 31, with the detector sensor 17 being placed behind the tracking sensor 18 in a plane parallel thereto. The elementary sensors 32 to 35 are electrically insulated from one another by strips 36, e.g. horizontal and vertical strips. An optical system 21 advantageously serves to focus the beam 7 on the sensor 17 during a fine tracking mode, and is situated on the axis 8 between the planes of the sensors 18 and 17.

Advantageously, in order to determine the position of the axis 8 of the beam 7 relative to the sensor 18, the difference-measuring method known by the term "mono-pulse" and well known to persons skilled in the art of radar is used, which method consists in forming a sum path and a difference path of the sensed signals in two planes that are perpendicular. It is also possible to determine the position of the beam relative to the center of the sensor from the amplitude difference between the signals illuminating the elementary sensors 32 and 34 in comparison with that illuminating the sensors 33 and 35, or from the amplitude of the signals illuminating the sensors 32 and 33 in comparison with that illuminating the sensors 34 and 35. The sum and difference paths can also be formed by calculation after digitizing the signals received by operational amplifiers.

FIGS. 5a and 5b show a fine tracking mode of great accuracy in a restricted field of view, while FIG. 5c shows a coarse tracking mode suitable for performing large-amplitude corrections quickly in a large field of view.

In a first variant embodiment, the coarse mode also makes it possible to acquire a beam 7.

In a second variant embodiment, the device of the invention includes a separate system (not shown) for acquiring the beam 7.

In the advantageous example shown in FIG. 5, the beam 7 focused by the optical systems 20 and 21 includes a central illumination zone 37 of the beam 7 forming a disk whose area is advantageously less than or equal to the area of the detector sensor 17 and forming a ring 38 concentric with the disk 37.

When the axis 8 of the beam 7 is centered on the tracking sensor 18, as shown in FIG. 5a, all four sensors 32 to 35 receive a signal of the same amplitude.

When the axis 8 of the beam 7 no longer corresponds to the center of the sensor 18, as shown in FIG. 5b, the individual sensors are no longer illuminated by the same area of the ring 38. Insofar as the light energy is distributed substantially uniformly over the area of the ring 38, the amplitudes of the signals received from the various individual sensors are no longer equal. In the example shown in FIG. 5b, the sensor 34 receives more energy than either of the sensors 32 and 35, while the sensor 33 receives the least energy. Generating control signals for the actuators 23 and 24 should enable the energies received by all four sensors 32 to 35 to be made equal again so as to return to the situation shown in FIG. 5a.

It should be observed that during tracking in fine mode, as shown in FIGS. 5a and 5b, the central illumination zone 37 of the beam 7 passes through the opening 31 of the sensor 18 so as to illuminate the detector sensor 17. Signals continue to be received while tracking is taking place in fine mode.

In contrast, as shown in FIG. 5c, the central illumination zone 37 of the beam 7 no longer falls on the central opening 31 of the tracking sensor 18, but falls on one of the individual sensors 32 to 35. As a result, the system switches to coarse tracking mode when the detector sensor 17 does not receive the signal. In the example shown in FIG. 5c, the individual sensor 33 receives no signal while the sensor 34 is illuminated by the central illumination zone 37 which includes the major fraction of the energy in the beam 7. It should be observed that under such circumstances the central illumination zone 37 of the beam 7 is focused by the optical system 20 onto the plane of the sensor 18 and it is no longer focused by the optical system 31 onto the plane of the sensor 17. The individual sensor 34 provides a signal of very large amplitude enabling pointing of the beam 7 to be corrected quickly so as to return to the fine tracking mode of FIG. 5b and then to centering of the axis 8 of the beam 7 as shown in FIG. 5a.

The sensors 17 and 18 may be constituted by PIN diodes, for example, and/or by avalanche photodiodes.

The invention is naturally not limited to being implemented with visible light. A device using a beam 7 of infrared light or of ultraviolet light does not go beyond the scope of the present invention.

Similarly, after passing through the opening 31 formed in the tracking sensor 18, the axis 8 of the beam 7 may be reflected on a mirror without going beyond the scope of the present invention.

The invention is mainly applicable to optical communications between satellites, or with a satellite, to devices of the lidar type for measuring distance and azimuth, and also to implementing homing systems.

I claim:

1. A data acquisition device for acquiring data from a light beam, the device comprising a lens system, a stiff frame, a first sensor, and a second sensor, said first and second sensors being fastened on said frame in successive alignment on a common axis of the beam, the first sensor including, on the axis of the beam, a transparent zone, in particular an opening, that is transparent to at least a portion of the beam, thereby enabling the second sensor to be illuminated.

2. A device according to claim 1, wherein the first photoelectrical sensor is an acquisition sensor and/or a tracking sensor for the beam, said sensor including a plurality of elementary photoelectrical sensors suitable for being illuminated by signals of amplitudes that depend on the orientation of the beam relative to said acquisition and/or tracking sensor, and in that the second sensor is a detector sensor for receiving data contained in the beam in the form of beam modulation.

3. A device according to claim 1, wherein the lens system distributes a fraction of the energy of the beam simultaneously on the first sensor and on the second sensor.

4. A device according to claim 3, wherein the lens system is a hybrid optical system including an optical element operating in a reflection mode or in a refraction mode, and an optical element operating in a diffraction mode.

5. A device according to claim 4, wherein the lens system includes a lens focusing the major portion of the beam on the transparent zone of the first sensor, and a circular diffraction grating projecting a circular ring of light on the first sensor, said circular ring being centered on the axis of the beam.

6. A device according to claim 1, further including an optical system disposed on the optical axis between the first sensor and the second sensor to focus the light that penetrates through the transparent zone onto the second sensor.

7. A device according to claim 1, wherein the second sensor receives substantially 80% to 95% of the light energy in the beam as delivered by the lens system.

8. A device according to claim 6, wherein the second sensor has a larger field of view than the first sensor.

9. A device according to claim 1, wherein said frame comprises a second sensors are secured relative to each other by a one-piece part made of a material that has low thermal expansion.

10. A communications system, in particular for satellites, wherein the system includes a device for emitting a beam of light modulated by data to be transmitted, and at least one device according to claim 1.

11. A device for acquiring data from a light beam, the device comprising an optical system, a first sensor, and a second sensor, wherein at least the two sensors are in successive alignment on a common axis of the beam, the first sensor including, on the axis of the beam, a transparent zone, in particular an opening, that is transparent to at least a portion of the beam, thereby enabling the second sensor to be illuminated, wherein the optical system distributes a fraction of the energy of the beam simultaneously on the first sensor and on the second sensor, the optical system being a hybrid optical system including an optical element operating in a reflection mode or in a refraction mode, and an optical element operating in a diffraction mode, and wherein the optical system includes a lens focusing the major portion of the beam on the transparent zone of the first sensor, and a diffraction grating, in particular a circular grating, projecting a ring of light on the first sensor, in particular a circular ring centered on the axis of the beam.

12. A device for acquiring data from a light beam, the device comprising an optical system, a first sensor, and a second sensor, wherein at least the two sensors are in successive alignment on a common axis of the beam, the first sensor including, on the axis of the beam, a transparent zone, in particular an opening, that is transparent to at least a portion of the beam, thereby enabling the second sensor to be illuminated, further including another optical system disposed on the optical axis between the first sensor and the second sensor to focus the light that penetrates through the transparent zone onto the second sensor.

* * * * *